E. F. DENNISON.
Dredging Machines.
No. 196,565                              Patented Oct. 30, 1877.
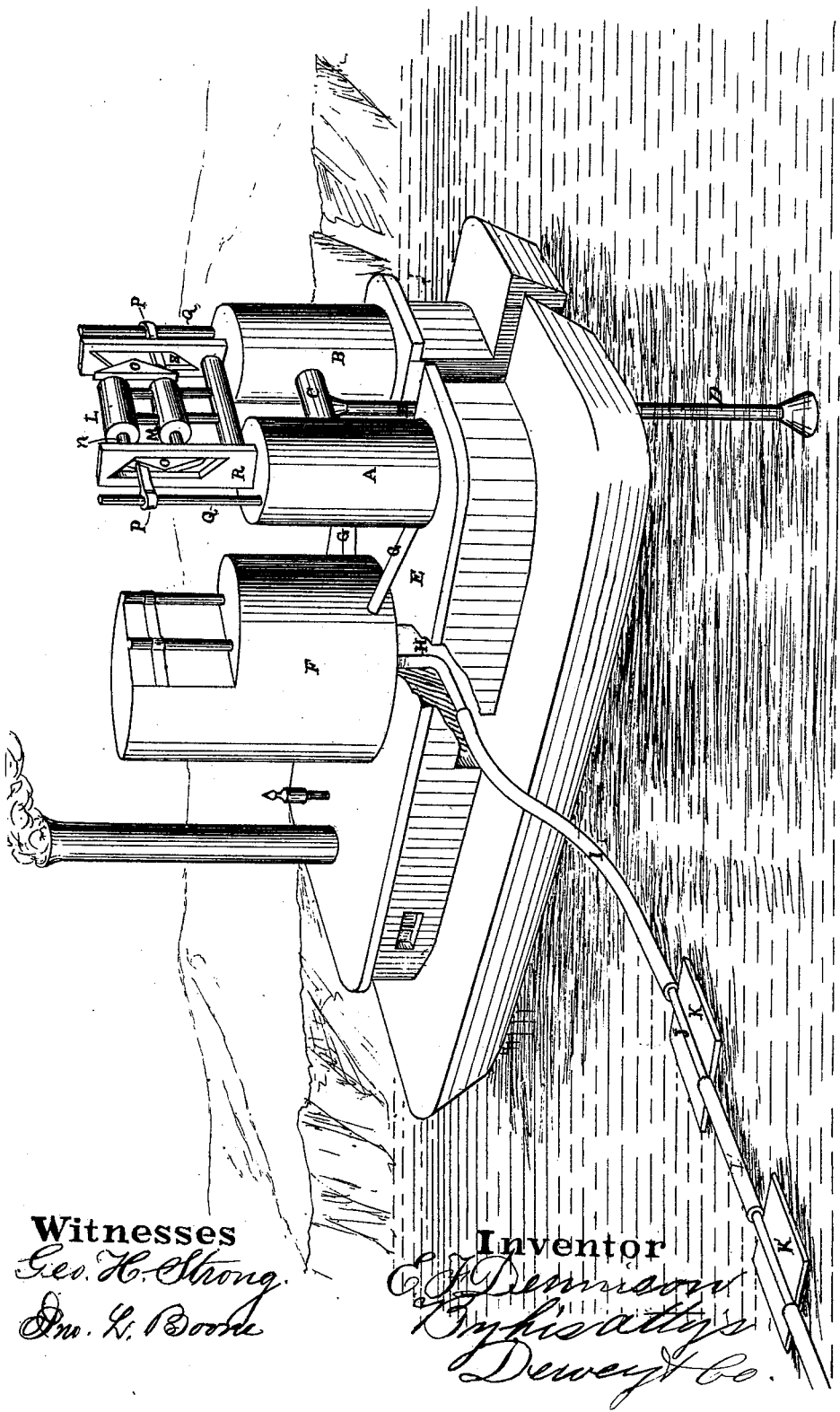

UNITED STATES PATENT OFFICE.

EZRA F. DENNISON, OF SAN FRANCISCO, CALIFORNIA.

IMPROVEMENT IN DREDGING-MACHINES.

Specification forming part of Letters Patent No. 196,565, dated October 30, 1877; application filed August 30, 1877.

*To all whom it may concern:*

Be it known that I, EZRA F. DENNISON, of the city and county of San Francisco, and State of California, have invented an Improved Dredging Apparatus; and I do hereby declare the following to be a full, clear, and exact description thereof, reference being had to the accompanying drawing.

My invention relates to an improved dredging machine or apparatus, which is especially adapted for raising mud from the bottom of a river, lake, or bay, and conducting it to a distance from the dredging-machine, for the purpose of depositing it either upon land or in water.

My machine is more especially intended as a levee-building machine. It takes the mud and heavy material which forms the bottoms of bays and water-courses and deposits it in a line along the bank, so as to form a levee or embankment for reclamation purposes.

My invention consists in the employment of one or more steam vacuum-pumps, located on a suitable platform or vessel, and connected with a pressure or reservoir tank, into which the material is delivered by the pumps. A flexible floating pipe, of peculiar construction, connects the pressure or reservoir tank with the place where the material is to be delivered, and serves to conduct the material away from the tank and deliver it at the point where it is to be delivered.

It also consists in a peculiar method of operating the valves, which alternately deliver steam and water to the vacuum-cylinders.

Referring to the accompanying drawing, the figure represents a perspective view of my device.

A B represent two steam vacuum-pumps, each of which may be provided with a flexible suction pipe or tube and exhaust-pipe; but in the present case I have shown them as standing side by side, and having a hollow feed-pipe, C, extending from one to the other, and adapted to rotate, that the common telescopic supply-pipe D, which extends downward from the center of this pipe to the substance to be dredged, may be directed vertically or obliquely downward.

These pumps can be mounted upon a permanent platform over the place from which the dredgings are to be taken, or, preferably, upon a floating vessel, of which E represents the deck. This vessel can be moved about at will, so as to take mud from any desired spot at the bottom of a river, lake, or bay.

I supply steam to these cylinders by means of a steam-boiler properly located, so as to produce a vacuum by the condensation of the steam in the ordinary way of operating steam vacuum-pumps, and suitable valves alternately open and close the communication between the cylinders and the pipe C, so that first one cylinder and then the other may be filled, one valve being closed while the other is open.

F is a pressure tank or reservoir, the top of which can be either open or closed, as desired, and its object is to provide a sufficient head to produce a steady and continuous flow of the discharged material through the exit-tube. This tank is located near the cylinders A B, upon the same structure, and the exhaust-pipe G, from each of the cylinders, leads into it at some point above its bottom, and these cylinders discharge into this common reservoir pressure-tank, as shown. A pipe, H, leads from the bottom of the tank F down to the surface of the water. The lower end of this pipe is curved to a horizontal position, and a flexible hose-section, I, is attached to it. The opposite end of this hose-section is connected with a tube, J, which passes over and is permanently attached to a ponton, K, while another flexible hose-section, I, then connects the opposite end of this ponton-tube with another ponton-tube, K', and so on to any desired extent, thus providing a floating tube for conveying the dredged material over the surface of water which intervenes between the vessel or structure and the land or the place of deposit.

The common suction-pipe of the cylinders has a flaring or bell-shaped mouth, which will rest upon the muddy bottom of the bay. A vacuum is then created in the cylinders by admitting steam into them alternately from the steam-drum L, and condensing it by a flow of water from a water-tank, M, or similar equivalent devices, in the ordinary manner of operating a steam vacuum-pump, thus causing the mud and water underneath the bell-shaped mouth of the suction-pipe to rush up into and fill the cylinders. Steam is then admitted under pressure into the filled cylinder, and the material contained in it is forced through the pipes D into the reservoir-tank F.

The valves attached to the rods $n$, extending from the ends of the steam and water drums, may be of any ordinary and well-known construction, and are so arranged that when water is admitted from drum M into one of the pump-cylinders, steam will pass at the same time from drum L into the other cylinder, and this action will be reversed as the blocks O are alternately acted upon by the cams P. The valves for alternately opening and closing the ends of the connecting-pipe C and discharge-pipes G may be of any of the well-known forms.

The accumulation of the material, together with the confined air in the reservoir-tank, serves to give a steady uniform pressure through the conducting-pipe, which forces the material to the point of discharge. This tank is of great importance, as without it the work of the pumps would be obstructed and the pressure insufficient. I have found that without this reservoir pressure-tank it is impossible to produce a steady flow through the discharge-pipes, or to prevent a back action upon the vacuum-pumps; but, since I commenced the use of my present apparatus in April, 1876, I have been enabled to produce a continuous flow through a thousand feet of pipe without any back action upon the pumps.

Another important feature of my dredging apparatus is the floating tubes. These sections, in practice, constitute the principal portion of the length of my carrying-tube, and the flexible uniting-sections merely serve to relieve the rigidity, allow changes of direction, and facilitate the introduction and connection of as many pontons as may be needed to reach the point of deposit, which will necessarily vary as the relative position of the bank or levee and that of the dredger are changed.

In order to operate the steam and water valves of the supply-drums L and M, I have shown them as provided with shafts or rods $n$, which extend out through the ends of their respective drums. These rods are connected by blocks O secured so as to unite the adjacent ends of the pairs of rods. The exterior faces of these blocks form convexly-meeting inclined planes, as shown. These planes are alternately acted upon by toes or cams P, so as to force the valves from side to side, and thus open the steam-supply for one cylinder, and the condensing or water supply for the other, and thus reverse the valves. This is effected by mounting the cams P upon the vertically-moving rods Q, which serve to open and close the mud-valves of the cylinder A B between collars, which compel them to rise and fall with the valve-stems, but at the same time allow of a movement from side to side. This movement from side to side is made to allow the cams to lift up at one side of the valve-actuating planes O, and then be carried into a line with the planes, so as to force the valves over by their descent. In order to accomplish this the standards R have made through them rhomboidal slots S, through which the ends of the cams project. It will be seen that the cams will follow up the straight side as they rise, and when they reach the inclined side will be carried across to the opposite side of the slot. When they descend they strike their inclined planes O and actuate the valves, as before described. After passing below this point the cam strikes the lower inclined side of the slot, and is by it forced over again to the side, up which it follows, and by this simple construction I am enabled to operate my valves without difficulty, the whole forming a complete dredging apparatus.

Having thus described my invention, what I claim, and desire to secure by Letters Patent, is—

1. A dredging apparatus consisting of one or more steam vacuum-pumps, A B, provided with a suction pipe or pipes, C D, and exhaust-pipes G, the reservoir pressure-tank F, and the flexible floating tube I J, all combined and operated substantially as and for the purpose described.

2. The device for operating the steam and water valves of the vacuum-cylinders, consisting of the cams or toes P, mounted upon the stems Q, and moving in the rhomboidal guide-slots S, in combination with the double inclined planes O, connecting the opposite valves, substantially as herein described.

In witness whereof I have hereunto set my hand and seal.

E. F. DENNISON. [L. S.]

Witnesses:
 FRANK A. BROOKS,
 WM. H. THOMPSON.